W. T. SEARS.
DRILL TABLE MECHANISM.
APPLICATION FILED JULY 28, 1919.
1,414,487. Patented May 2, 1922.
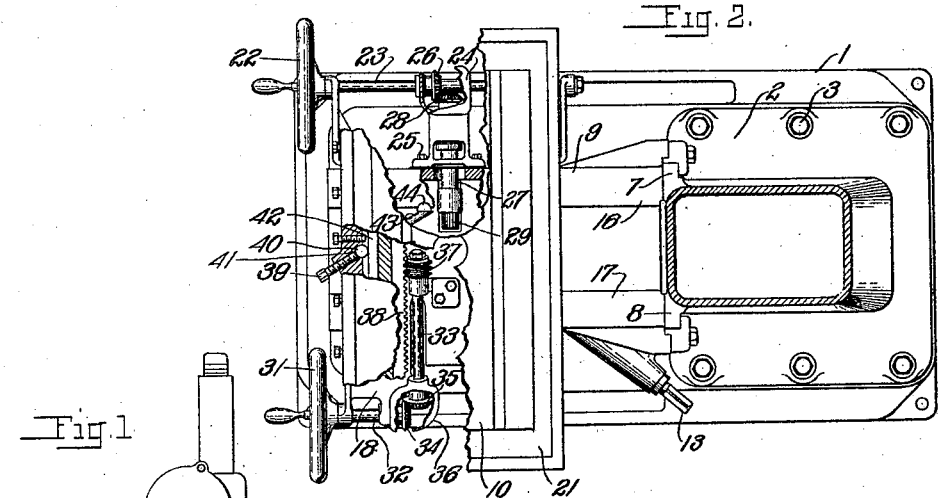
INVENTOR
Willard T. Sears
BY S. Jay Teller
ATTORNEY

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

DRILL-TABLE MECHANISM.

1,414,487. Specification of Letters Patent. Patented May 2, 1922.

Application filed July 28, 1919. Serial No. 313,905.

*To all whom it may concern:*

Be it known that I, WILLARD T. SEARS, a citizen of the United States, residing at Montclair, in the county of Essex and State of New Jersey, have invented certain new and useful Improvements in Drill-Table Mechanisms, of which the following is a specification.

The present invention deals with that form of drilling machine having a vertical spindle rotatable about a fixed axis and a horizontal work-support located beneath the spindle. The object of this invention is to provide an improved work-support of the type known as a compound table which permits of longitudinal and transverse adjustments in a horizontal plane. These adjustments are of great convenience in properly centering the work and in accordance with my invention the means of controlling these adjustments are so located that they may be operated simultaneously; although they are independent of each other. The invention also includes an improved clamping device and has other advantages which will be disclosed in the specification.

In the drawings, I have shown the invention embodied in a preferred form, but it will be understood that the drawings are not to be construed as limiting or defining the scope of the invention, the accompanying claims being relied upon for that purpose.

Of the drawings:

Fig. 1 is a side view of a vertical drilling machine embodying the invention with a portion of the work-support broken away.

Fig. 2 is a sectional view through the line 2—2 of Fig. 1 with a portion of the table broken away to show the operating mechanism.

Fig. 3 is a fragmentary front view of the work-support with a portion broken away.

Fig. 4 is a diagrammatic view of the locking device.

Referring to the drawings, 1 is the bed of the machine and a vertical column 2 is secured thereto by means of bolts 3. A drill head 4 is either secured to the column 2 or integral therewith and a vertical spindle 5 is rotatably mounted in suitable bearings in the drill head. A motor 6 is supported on the column and by means of mechanisms encased within the drill head 4, is used to drive and feed the spindle. These mechanisms are not shown in detail, as they are not essential to the present invention and they, as well as other parts of the machine described above, may be widely varied.

Preferably, the column is provided with vertical guideways 7 and 8 and the main support or carriage 9 of the work-support 10 is constructed to engage the guideways and is slidably mounted thereon. Means are provided to vertically adjust the work-support along these guideways comprising a bracket 11 bolted to the bed and a vertical screw 12 having a bearing in the carriage 9. A mechanism is provided for rotating this screw and thus elevating or lowering the work-support, and consists of a horizontal shaft 13 rotatably mounted in the carriage 9 and connected to the screw by means of bevel gears 14 and 15. This adjustment is entirely independent of additional adjustments hereafter described and may be altered or omitted without affecting the scope of the present invention.

The carriage 9 is provided with horizontal guideways 16 and 17 and a saddle 18 is constructed to engage these guideways and is slidably mounted thereon. The upper portion of the saddle 18 is provided with two additional guideways 19 and 20 also in a horizontal plane but extending in a direction perpendicular to that of guideways 16 and 17. A table 21 is adapted to engage these guideways and is slidably movable therealong, this table being the member upon which the work is supported. It may be seen that by means of these two sliding engagements that the table is movable in all directions in a horizontal plane in relation to the carriage 9.

Two independent mechanisms are provided by means of which these two adjustments may be conveniently effected. In accordance with my invention, the means for adjusting the saddle 18 along the carriage 9 comprises a hand-wheel 22 mounted on a shaft 23 which is rotatably mounted in bearings secured to the saddle 18. The shaft 23 passes through a bracket 24 secured to the carriage 9 by means of bolts 25 and a bevel gear 26 is mounted on the shaft within this bracket. The bracket 24 also provides bearings for a shaft 27 which is at right angles to shaft 23. To one end of shaft 27 is secured a bevel gear 28 which meshes with the bevel gear 26 mounted on shaft 23. The bevel gear 26 is splined to the shaft 23 in such a way that it will rotate with shaft 23 but is movable therealong. The bevel gear 26 is held in place by means of the bracket 24 and the gear 28 and hence its position relative to the carriage 9 does not change, the shaft 23 sliding through it longitudinally when the saddle 18 is moved. A pinion 29 is either secured to or formed as a part of the opposite end of shaft 27. A rack 30 secured to the saddle meshes with this pinion and is parallel to the guideways 16 and 17. It may be seen that when the hand-wheel 22 is rotated the pinion 29 will also be rotated by means of the shafts 23 and 27 and the bevel gears 26 and 28. The rotation of the pinion by means of the engagement between its teeth and those of the rack 30 will effect movement of the saddle on the carriage 9.

The means for effecting the adjustment of the table along the saddle comprises a second hand-wheel 31 secured to a shaft 32 which is also mounted in suitable bearings secured to the saddle 18. A shaft 33 is mounted in bearings in the saddle 18 at right angles to the shaft 32 and in the construction illustrated is inclined slightly with the horizontal. The shafts 32 and 33 are connected by bevel gears 34 and 35 held in place by a bracket 36. At the opposite end of shaft 33 is secured a helical pinion 37 which meshes with a rack 38 secured to the table. When the hand-wheel 31 is rotated this pinion is also rotated by means of the shafts 32 and 33 and the bevel gears 34 and 35 and the table is moved relative to the saddle. As the pinion 37 is located near the center line of the saddle 18, a maximum equal adjustment of the table 21 on each side of the center line is possible.

A novel means is provided for simultaneously clamping the table against these two adjustments. This device comprises a screw 39 fitted into a tapped hole in the saddle 18, the head of which is constructed to be engaged by a wrench for conveniently rotating it. A vertical pin 40 is loosely fitted into a hole 41 in the saddle 18. The upper end of this pin engages a gib 42 which is in contact with the table 21 while the lower end engages a rod 43 extending toward the guideway 16 and in contact with a second vertical pin 44 shaped to engage this guideway. The screw 39 may be rotated to apply pressure to the pin 40 which is transmitted to the carriage 9 and the table 21 by means of the gib 42 and the pin 44. It will be noted that the point of application of pressure of the screw 39 on the pin 40 is between the gib 42 and the rod 43. This construction allows the pin 40 to act as a lever so that the screw 39 may be moved until both the table 21 and the carriage 9 are tightly engaged.

It will be noticed that both hand-wheels and the locking device are mounted on the saddle 18 and hence their relative positions are unchanged by any adjustments. When the operator is standing in front of the machine, he is in a position where he can reach both hand-wheels and the locking device, enabling him to adjust the table horizontally and secure it in place without changing his position.

What I claim is:

1. In a drilling machine, a work-support comprising a table, means for adjusting the table in a plurality of relatively angular directions horizontally, and a device for locking the table against horizontal adjustment, in any of the said directions, the adjusting means and the locking device being located at the front of the machine within easy reach of the operator.

2. In a drilling machine, a work-support comprising a table, means for adjusting the table in a plurality of relatively right angular directions horizontally, and a device for simultaneously locking the table against all the said horizontal adjustments, the adjusting means and the locking device being located at the front of the machine within easy reach of the operator.

3. In a drilling machine, a work-support comprising a main support, a saddle mounted thereon and horizontally adjustable therealong, a table mounted on the saddle and horizontally adjustable therealong, and a device enabling the simultaneous locking of the table against both adjustments.

4. In a drilling machine, a work-support comprising a main support, a saddle mounted thereon and horizontally adjustable therealong, a table mounted on the saddle and horizontally adjustable therealong, means whereby these adjustments may be effected, and a device enabling the simultaneous locking of the table against both adjustments, the adjusting means and the locking device being located at the front of the machine within easy reach of the operator.

5. In a drilling machine, a work-support comprising a main support, a saddle mounted thereon and horizontally adjustable therealong, a table mounted on the saddle and horizontally adjustable therealong, means at the front of the machine for adjusting the table and saddle in relatively right angular directions and for simultaneously locking the table and saddle against such adjustments.

6. In a drilling machine, a work-support comprising a main support, a saddle mounted thereon and horizontally adjustable therealong, a table mounted on the saddle and horizontally adjustable therealong, means on one of the members at the front of the machine for adjusting the table and saddle in relatively right angular directions and for locking the table and saddle against such adjustment.

7. In a drilling machine, a work support comprising a main support, a saddle mounted thereon and horizontally adjustable therealong, a table mounted on the saddle and horizontally adjustable therealong, means on one of the members at the front of the machine for adjusting the table and saddle, and a locking device at the front of the machine for locking both the table and saddle against adjustment.

8. In a drilling machine, a work-support comprising a main support, a saddle mounted thereon and horizontally adjustable therealong, a table mounted on the saddle and horizontally adjustable therealong, two separate means at the front of the machine for adjusting the table and saddle respectively, and a locking device also at the front of the machine and between the two adjusting means for simultaneously locking the table and saddle against adjustment.

9. In a drilling machine, a work-support comprising a main support, a saddle mounted thereon and horizontally adjustable therealong, a table mounted on the saddle and horizontally adjustable therealong, means on one of the members at the front of the machine for adjusting the table and saddle, and a locking device also on the same member at the front of the machine for locking both the table and saddle against adjustment.

10. In a drilling machine, a work-support comprising a main support, a saddle mounted thereon and horizontally adjustable therealong, a table mounted on the saddle and horizontally adjustable therealong, means on one of the members at the front of the machine for adjusting the table and saddle, and a locking device on the saddle at the front of the machine for simultaneously locking the table and saddle against adjustment.

11. In a drilling machine, a work-support comprising a main support, a saddle mounted thereon and horizontally adjustable therealong, a table mounted on the saddle and horizontally adjustable therealong, two separate means mounted on one of the members at the front of the machine for adjusting the table and saddle respectively in relatively right angular directions, and a locking device also at the front of the machine on the said one member and between the two adjusting means for locking both the table and saddle against adjustment.

12. In a drilling machine, a work-support comprising a main support, a saddle mounted thereon and horizontally adjustable therealong, a table mounted on the saddle and horizontally adjustable therealong, two separate means mounted on the saddle at the front of the machine for adjusting the table and saddle respectively in relatively right angular directions, and a locking device also at the front of the machine and between the two adjusting means for locking both the table and saddle against adjustment.

13. In a drilling machine, a work-support comprising a main support, a saddle mounted thereon and horizontally adjustable therealong, a table mounted on the saddle and horizontally adjustable therealong, and a device on the saddle whereby pressure may be exerted on the main support and the table enabling the simultaneous locking of the table against both adjustments.

14. In a drilling machine, a work-support comprising a main support, a saddle mounted thereon and horizontally adjustable therealong, a table mounted on the saddle and horizontally adjustable therealong, and a device including a manually operable screw fitted into a tapped hole in the saddle by means of which pressure may be exerted on the main support and the table enabling the simultaneous locking of the table against both adjustments.

15. In a drilling machine, a work-support comprising a main support, a saddle mounted thereon and horizontally adjustable therealong, a table mounted on the saddle and horizontally adjustable therealong, a device on the saddle including a manually operable screw fitted into a tapped hole in the saddle, a pin loosely mounted in the saddle, and means whereby pressure applied to the pin by means of the screw is transmitted to the main support and the table enabling the simultaneous locking of the table against both adjustments.

16. In a drilling machine, a work-support comprising a main support, a saddle mounted thereon and horizontally adjustable therealong, a table mounted on the saddle and horizontally adjustable therealong, a mechanism whereby the saddle may be adjusted relative to the carriage including a pinion rotatably mounted in the main support, an intermeshing rack secured to the saddle, a mechanism whereby the table may be adjusted relative to the saddle including a pinion mounted on the saddle and an intermeshing rack secured to the table, and means on one of the members at the front of the machine for rotating both pinions.

17. In a drilling machine, a work-support comprising a main support, a saddle mounted thereon and horizontally adjustable therealong, a table mounted on the saddle and horizontally adjustable therealong, two independently operable mechanisms for effecting these adjustments each including a rack, two shafts, two intermeshing bevel gears connecting the shafts, a pinion mounted on one shaft meshing with the rack and a hand-wheel mounted on the other whereby the pinion may be rotated by rotating the hand-wheel, the engagement between the rack and the rotating pinion effecting the desired adjustment, and a device enabling the simultaneous locking of the table against both adjustments, the locking device and the hand-wheels being located so they may be conveniently reached by the operator from a position in front of the machine.

In testimony whereof, I hereto affix my signature.

WILLARD T. SEARS.